Patented June 5, 1945

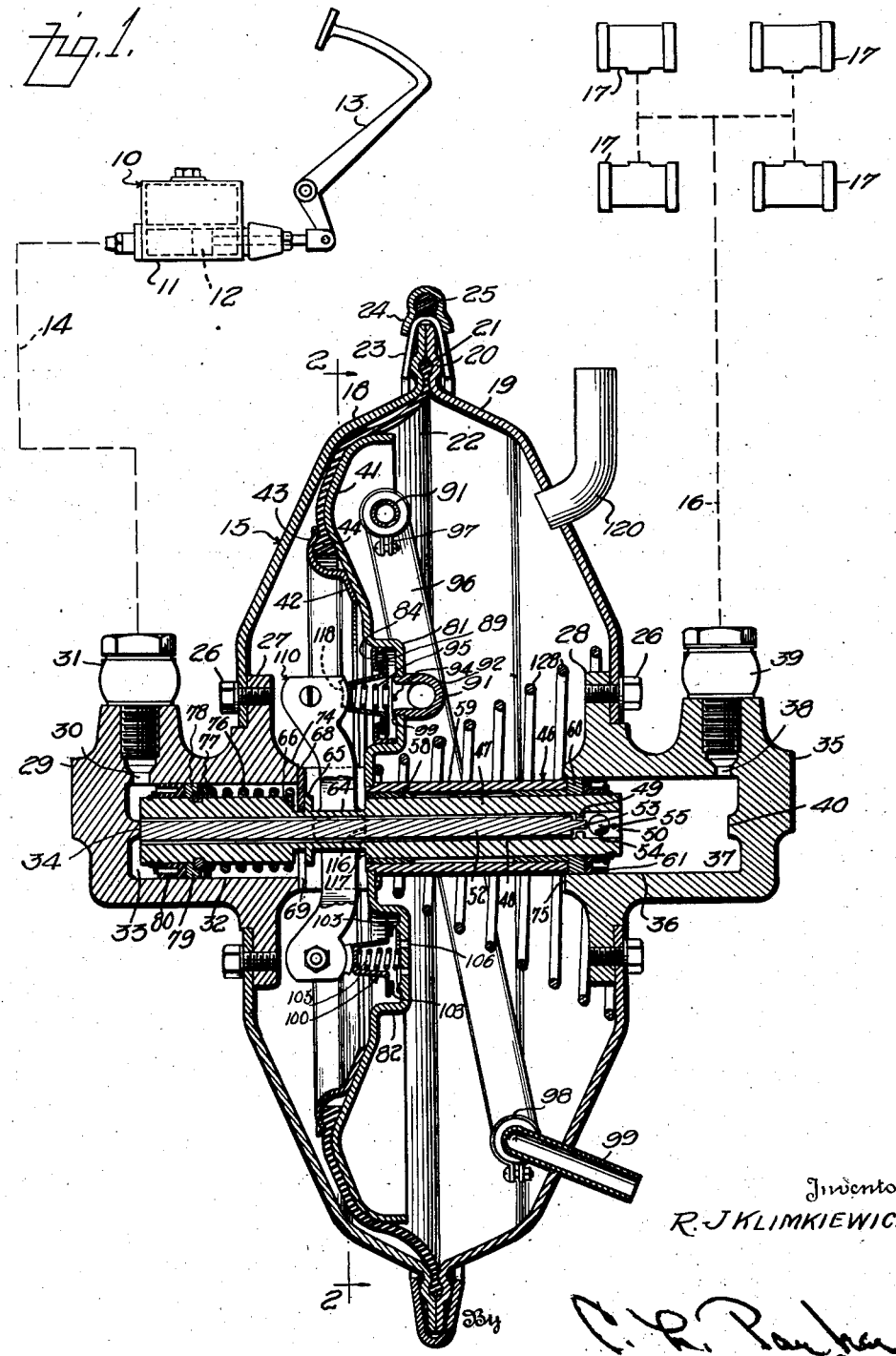

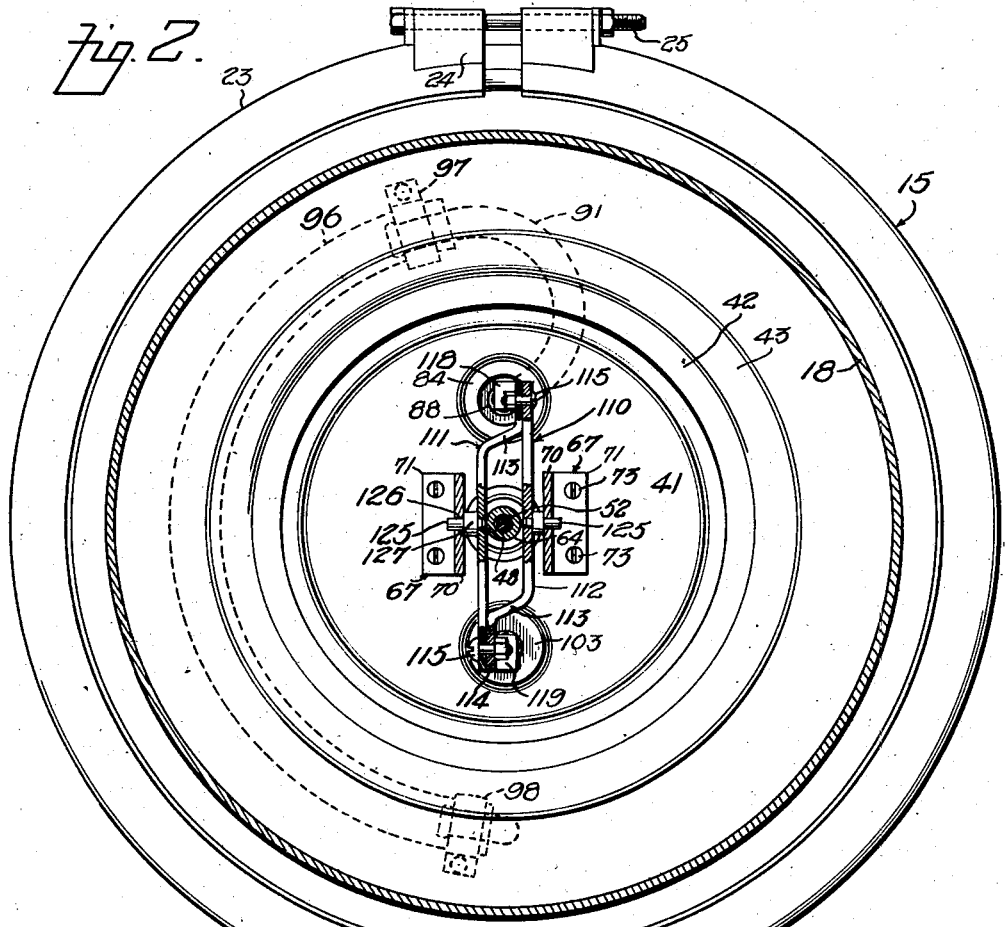
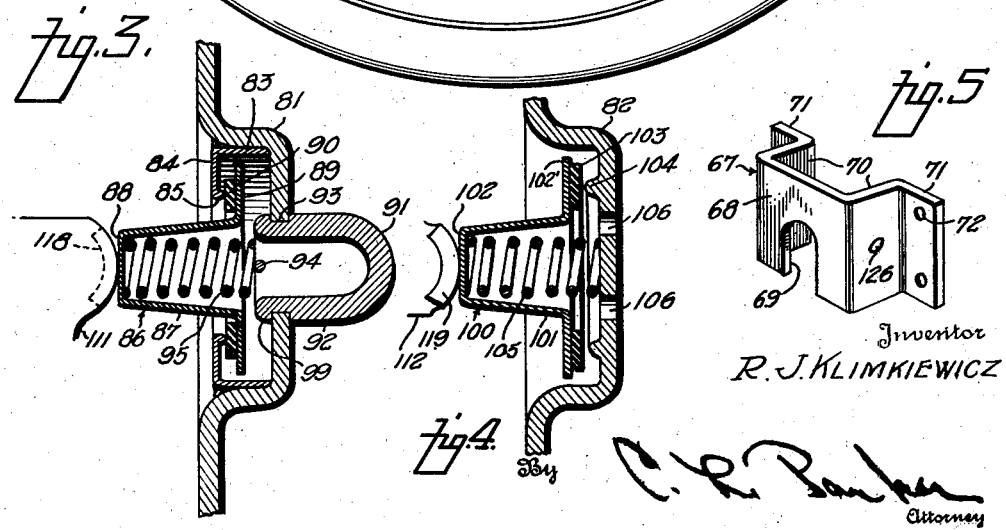

2,377,699

UNITED STATES PATENT OFFICE 2,377,699

HYDRAULIC BRAKE MECHANISM

Rudolph J. Klimkiewicz, Newark, N. J., assignor, by mesne assignments, to Empire Electric Brake Company, Newark, N. J., a corporation of New Jersey Application September 30, 1943, Serial No. 504,451

8 Claims. (Cl. 60—54.5)

This invention relates to hydraulic brake mechanisms, and more particularly to a hydraulic booster brake mechanism for motor vehicles, of the type wherein the booster unit is connected to the vehicle master cylinder and to the wheel cylinders by hydraulic lines, whereby the mechanism is rendered operative by fluid displaced from the master cylinder to increase the hydraulic pressure in the brake cylinders to apply the brakes.

A number of highly efficient and commercially practicable hydraulic booster brake mechanisms have been developed wherein the hydraulic fluid displaced from a vehicle master cylinder is utilized for actuating a booster motor to displace fluid into the brake cylinders to apply the brakes, the pressure developed by the foot of the operator performing part of the work in applying the brakes. Highly practicable mechanisms of the type referred to are shown, for example, in the patents to Berteli Stelzer Nos. 2,260,490, 2,260,491 and 2,260,492, granted October 28, 1941.

While devices of the type referred to have proved to be highly practicable in operation, it is desirable that the cost of manufacturing devices of this character be reduced. It is also highly desirable to provide a device of this character wherein the valve mechanisms operate to provide as rapid a response as possible to movements of the vehicle brake pedal.

An important object of the present invention is to provide a power operated brake mechanism of the general character referred to wherein the valve mechanism is of such character as to provide an extremely rapid and sensitive response of the booster motor to movements of the brake pedal.

A further object is to provide such an apparatus wherein a multiplied movement of the valve parts takes place for a given displacement of fluid from the master cylinder, thus increasing the rapidity of the response of the booster motor to movements of the brake pedal.

A further object is to provide a power-operated booster brake mechanism wherein simple, economically manufactured poppet valves are employed for controlling fluid pressures in the booster motor, thus reducing the cost of manufacture of the device while greatly improving the efficiency of the mechanism.

A further object is to provide such a mechanism which is extremely sensitive as to "feel" and as to the accuracy of the follow-up operation of the booster motor with respect to the movement of the brake pedal, such accuracy improving the "feel" in the brake pedal by making it accurately proportional under all conditions to the degree of brake application.

A further object is to provide a brake mechanism of this character wherein the substantial use of stampings and the duplication of elements for different parts of the apparatus combine to greatly reduce the cost of manufacture of the device.

Other objects and advantages of the invention will become apparent during the course of the following description.

In the drawings I have shown one embodiment of the invention. In this showing:

Figure 1 is a central axial sectional view through the booster unit, parts being broken away and parts being shown in elevation, the master cylinder and associated elements, and the wheel cylinders being shown diagrammatically in connection with the booster unit, Figure 2 is a section taken substantially on line 2—2 of Figure 1, parts being broken away and parts being shown in elevation, Figure 3 is an enlarged fragmentary sectional view taken centrally through the air valve and associated elements, Figure 4 is a similar view taken through the vacuum valve, and Figure 5 is a detailed perspective view of the lever supporting element.

Referring to Figure 1 the numeral 10 designates the conventional manually operated portions of a hydraulic vehicle brake mechanism comprising a master cylinder 11, a piston 12 operable therein to displace fluid therefrom, and a foot pedal 13 operable for actuating the piston 12. Upon operation of the pedal 13, hydraulic fluid is displaced from the master cylinder 11 through a conduit 14 to a booster unit indicated as a whole by the numeral 15. From the booster unit, fluid is displaced through a conduit 16 to the four wheel cylinders of the braking mechanism, all of which are conventional and are indicated by the numeral 17.

The booster mechanism comprises a motor formed of a pair of casing sections 18 and 19 which are preferably stampings from the same dies. These stampings are provided with complementary grooves 20 to receive the preferably thickened edge 21 of a flexible diaphragm 22. The outer peripheral edges of the casings 18 and 19 are received in a stamped split clamping ring 23 the ends of which are provided with lugs 24 (Figure 2) through which passes a bolt 25 to clamp the ring 23 in position and thus secure the casing sections 18 and 19 together as a unit. The inner peripheral edges of the casings 18 and 19 are screwed or otherwise attached as at 26 to annular flanges 27 and 28 respectively. The flange 27 is preferably an integral part of a die cast cylinder element 29 having a lateral passage 30 with which the conduit 14 communicates, this conduit being mechanically connected with the cylinder element 29 by a suitable union 31. The passage 30 communicates with one end of a cylinder 32 formed in the element 29, such end of the cylinder 32 being designated by the numeral 33 and forming an inlet or primary pressure chamber. At the same end of the cylinder 32, the element 29 is provided with a stop lug 34 for a purpose to be described.

The flange 28 is an integral part of a second cylinder element 35 having a cylinder 36 formed therein with the end 37 of the cylinder forming an outlet or secondary pressure chamber. The cylinder element 35 is provided with a passage 38 communicating with the conduit 16, a union 39 being employed for providing a mechanical leak-proof connection between the cylinder element 35 and the conduit 16. The element 35 is also provided with a stop lug 40 identical with the stop lug 34. It will be apparent that the cylinder elements 29 and 35 are identical with each other, thus materially reducing the cost of producing the two cylinder elements for each booster unit. Likewise, the attaching screws 26 or other fastening elements are identical with each other, and the same is true of the unions 31 and 39.

A stamped steel plate 41 is arranged against the diaphragm 22 as shown in Figure 1. This plate is provided with a retaining ring 42 preferably welded thereto and having an annular dished portion 43 to receive the enlarged inner peripheral bead 44 of the diaphragm 22 to thus secure the inner peripheral portion of the diaphragm to the plate 41.

A piston structure indicated as a whole by the numeral 46 is adapted to be actuated by fluid displaced from the master cylinder and by the differential pressures affecting the pressure responsive unit of the motor 15 comprising the diaphragm 22 and plate 41. The piston structure 46 comprises a piston body 47 having an opening 48 extending from the left hand end of the body 47 as viewed in Figure 1 to a point spaced from the other end of the piston body. The opening or bore 48 communicates through an opening 49 with an axial opening 50 formed in the right hand end of the piston body 47 as viewed in Figure 1. A rod 52 (Figures 1 and 2) is mounted in the opening 48 and has a restricted end 53 projecting through the opening 49 and engaging a ball valve 54 the outward movement of which is limited by a stop pin 55. During operation of the mechanism the ball 54 seats against the adjacent end of the opening 49. When the parts are in the "off" positions shown in Figure 1, however, the rod extension 53 maintains the ball 54 off its seat to afford communication between the chambers 33 and 37 for a purpose to be described. The lug 34 (Figure 1) contacts the adjacent end of the rod 52 to move the ball 54 from its seat when the parts approach the "off" positions as will become apparent.

The right hand end of the piston structure 47 (Figure 1) is slidable in a bearing sleeve 58 driven into a piston sleeve 59, the right hand end of the sleeve 58 having an annular flange 60 seating against the adjacent end of the sleeve 59. The flange 60 slidably fits in the cylinder 36 to be moved thereinto when the motor 15 is energized in a manner to be described. A suitable packing cup 61 is arranged in the cylinder 36, surrounding the right end of the piston body 47 adjacent the flange 60.

Intermediate its ends, the piston body 47 is reduced as at 64 and an integral flange 65 separates the reduced piston portion 64 from a groove 66 formed in the piston body. A bracket indicated as a whole by the numeral 67 is provided with a vertical wall 68 notched as at 69 (Figure 5) to receive the portion of the piston body defined by the groove 66. Referring to Figure 1, it will be noted that the wall 68 of the bracket element is thinner than the width of the groove 66 and accordingly the piston body is slightly movable toward the right in Figure 1 independently of the bracket wall 68. This slight movement is utilized for the operation of the valve mechanism to be described.

The bracket element 67 is provided with spaced vertical side walls 70 and with oppositely extending foot portions 71 having openings 72 to receive screws 73 (Figure 2) whereby the bracket element may be secured rigidly to the plate 41. Accordingly it will be apparent that the bracket element 67 moves with the pressure responsive unit of the motor. Referring to Figure 1, it will be noted that the bracket wall 68 engages an extension 74 formed integral with the cylinder element 29. The cylinder element 35 carries a similar extension 75, but this element performs no particular function except for somewhat elongating cylinder 36. As previously stated, the cylinder elements 29 and 35 are identical for economy in manufacture, and the lug 40 also performs no function, this element being present solely because of the identity of the two cylinder elements.

A spring 76 surrounds the piston body 47 and has one end seating against the bracket wall 68. The other end of this spring engages a spring seat 77 held against movement by a two-part retaining ring 78 which, in turn, is retained in its groove in the piston body 47 by an under-cut ring 79. The latter ring backs up a suitable packing cup 80 on the adjacent end of the piston structure 47.

The plate 41 of the motor is provided with stamped cylindrical recesses 81 and 82 on diametrically opposite sides of the axis of the motor, and these recesses respectively contain the air control and vacuum control valves. The air control valve is shown in detail in Figure 3 and the vacuum control valve is similarly shown in Figure 4. Referring to Figure 3, the numeral 83 designates a sleeve pressed into the recess 81 and having a front wall 84 turned inwardly at its inner peripheral edge as at 85 to form a valve seat. A valve element 86 is formed of a conical body 87 having a closed outer end 88, and the opposite end of the body 87 is formed integral with an outstanding flange 89 against one face of which is secured in any suitable manner a valve element 90 engageable against the seat 85. The valve element 90 is normally closed, as will be referred to later.

A goose neck 91 (Figures 2 and 3) has one end turned inwardly as at 92 toward the recess 81 and is reduced as at 93 to extend therethrough, the extremity of the extension 92 being peened over as at 94 to rigidly secure the goose neck to the wall of the recess 81. A pin 94 acts as a seat for one end of a spring 95, the opposite end of which seats against the closed end 88 of the valve device 86.

A rubber or similar flexible hose 96 has one end clamped as at 97 to the outer end of the goose neck 91, and the other end of the hose is clamped as at 98 to a pipe 99 extending through the motor casing 19 and preferably welded thereto. The pipe 99 forms the air inlet for the motor, if the motor is operated by vacuum, and is connected to a source of super-atmospheric pressure if the motor is to be operated by such pressure. It is preferred that the motor be vacuum operated, in which case the pipe 99 is preferably connected to any suitable type of air cleaner (not shown).

The low pressure or vacuum control device is substantially identical with the valve device just described. Referring to Figure 4, the valve device is indicated by the numeral 100 and comprises a frustro-conical body 101 having a closed end 102. An integral outstanding flange 102' is carried by the body 101 and is provided with a valve element 103 engageable with a seat 104 formed as a ring raised from the bottom of the recess 82 by the internal die used in forming this recess. The valve element 103 is normally slightly unseated. A spring 105 is engageable at one end against the bottom of the recess 82 and has its other end engaging the closed end 102. This spring, therefore, tends to unseat the valve element 103, whereas the spring 95 (Figure 3) tends to seat the valve element 90. Openings 106 in the bottom of the recess 82 afford communication between opposite ends of the motor 15 when the valve element 103 is unseated.

A lever device indicated as a whole by the numeral 110 controls the operation of the two valves described. The lever device comprises a pair of preferably identical stamped lever elements 111 and 112 each of which has an angularly extending portion 113 extending toward the other lever element. Each such angular extension terminates in a foot 114 seating against the other lever element and secured thereto by a bolt 115. The arrangement referred to spaces the intermediate portions of the lever elements and such portions straddle the reduced portion 64 of the piston body 47. Each edge of the central portion of each lever element is provided with a raised portion 116, such raised portions at one side of the lever device engaging the shoulder 117 formed at the right hand end of the reduced portion 64 of the piston body 47, while the raised portions 116 at the opposite side of the lever device engage the flange 65. The lever element 111 is provided with a laterally extending foot 118 engaging the closed end 88 of the valve body 87. The lever element 112 is provided with a similar foot 119 engaging the closed end 102 of the valve body 100.

As previously stated, the motor 15 is preferably vacuum operated, in which case the pressure movable unit is vacuum suspended when the valve element 103 is in its normal open position as shown in Figure 4. The motor casing 19 carries a pipe 120 extending therethrough and preferably welded thereto, and when the motor is vacuum operated the pipe 120 is connected to a suitable source of vacuum, such as the intake manifold of a motor vehicle engine. If the motor is to be operated by super-atmospheric pressure, the pipe 120 is preferably provided with a suitable air cleaner (not shown) and directly communicates with the atmosphere.

Referring to Figure 2, it will be noted that each lever element 110 and 111 carries a pin 125 operable in a slot 126 formed in the adjacent bracket wall 70. Each of these pins may be provided with a flange 127 seating against its associated lever, and the inner end of the pin may be riveted to the lever. This arrangement retains the lever device 110 in its proper position, as will become apparent.

While the return springs of the wheel cylinders may be depended upon to return the parts to normal position, it is preferred that the motor 15 be provided with a return spring 128, as shown in Figure 1.

The operation of the apparatus is as follows:

The parts normally occupy the positions shown in the drawings, as stated above. When the operator desires to apply the brakes, he will depress the brake pedal 13 to displace fluid from the master cylinder 11 through pipe 14. The hydraulic fluid flows into the chamber 33, thence through the passage 48 around the rod 52 which is square in cross section, as shown in Figure 2. From the passage 48, fluid flows into the secondary chamber 37 and thence through pipe line 16 for distribution to the brake cylinders 17. Thus it will be apparent that initial displacement of fluid from the master cylinder operates to at least partially take up the slack between the brake shoes and drums prior to energization of the motor 15.

If the flow of fluid takes place in the manner described until all play has been taken up between the brake shoes and drums, resistance to further movement of the shoes will result in an immediate increase in pressure throughout the fluid lines from the master cylinder to the brake cylinders. This increased pressure will be the same in the chambers 33 and 37 (Figure 1) but the area of the piston in the chamber 33 will be greater than the area of the end of the piston body 47 exposed to pressure in the chamber 37. Accordingly the piston body 47 will be subjected to differential fluid pressures which will move it toward the right as viewed in Figure 1.

The play between the left wall of the groove 66 (Figure 1) and the bracket wall 68 permits the piston body 47 to move toward the right independently of the sleeve 59 and the other elements of the pressure responsive unit of the motor 15. Such movement of the piston body 47 will cause the flange 65 to push toward the right (Figure 1) against the central portion of the lever device 110. The spring 95 is somewhat stronger than the spring 105 of the vacuum valve, and movement imparted to the center of the lever device 110 will therefore take place with the lever device fulcruming at the point of contact of the foot 118 against the end wall 88 of the valve body 87. Thus the opposite end of the lever device will move toward the right to move the valve body 100 in the same direction. Since the distance between the contact points of the lever device 110 with the valve bodies 86 and 100 is twice the distance between the point of engagement of the flange 65 with the lever device and the point of contact of the foot 118 with the valve body 86, it will be obvious that the described movement of the valve lever will move the valve body 100 a distance twice as great as the movement of the piston body 47.

A very short distance of movement of the piston body 47 accordingly is necessary to seat the valve element 103 (Figure 4) and thus close communication between the two ends of the motor 15. Further movement of the piston body 47 will take place with the lever device 110 fulcruming at its lower end in Figure 1 with the upper end of the lever device moving twice the distance of movement of the piston body 47. This movement unseats the valve element 90 (Figure 4) and air will flow through pipe 99, flexible hose 96 and goose neck 91, around the air valve device and into the motor casing 18. The motor casing 19 remains in fixed communication with the source of vacuum through pipe 120, and accordingly differential pressures will be established in the motor to move the pressure movable unit of the motor toward the right as viewed in Figure 1.

The operation referred to causes the sleeve 59 to move toward the right to displace fluid from the pressure chamber 37 into the brake cylinders. At the same time it will be appreciated that movement of the piston body 47 toward the right in Figure 1 will have moved the ball 54 and the adjacent end of the opening 49 relatively toward each other, thus seating the ball and cutting off communication between the primary chamber 33 and the secondary chamber 37. Thus a braking pressure will be built up in the chamber 37 which will be the result of manual displacement of fluid by movement of piston body 47 toward the right, and displacement of fluid by the power actuation of the sleeve 59 and flange 60. Thus it will be apparent that a portion of the work involved in generating the braking pressure in the chamber 37, and accordingly in the wheel cylinders, will be performed by the operator by manual actuation of the pedal 13, the remaining work being performed by the fluid pressure motor 15. The proportionate work performed by the operator and by the motor may be determined in accordance with the relative areas of the piston element which displace fluid from the chamber 37, as will be obvious. It also will be apparent that any pressure in the chamber 37 will react upon the foot of the operator by opposing manual movement of the piston body 47 to a degree proportional to the braking pressure, thus providing the pedal 13 with highly accurate "feel."

It will be apparent, of course, that continuing operation of the brake pedal will result in corresponding movement of the piston body 47. The cross sectional area of the primary chamber 33 being equal to the cross-sectional areas of the master cylinder, the piston body 47 will always move the same distance as the piston 12. Such movement of the piston body 47 will be transmitted to the lever device 110 at the center thereof and the lever device will fulcrum at either end to effect a movement of the opposite end of the lever device which will be twice the movement of the piston body 47 and the master cylinder piston 12. Assuming that a continuous movement of the pedal 13 takes place up to the desired maximum application of the brakes, the continued application of force against the center of the lever device 110 by the piston body 47 will cause the air valve element 90 to remain off its seat to continuously feed air into the motor casing 18.

When the movement of the pedal 13 is arrested, movement of the piston body 47 will immediately cease and the pressure movable unit of the motor will continue to move, but only to the extent of an extremely small fraction of an inch. Such movement will be sufficient to permit the air valve 90 to close. Any tendency for the pressure movable unit of the motor to overrun to an appreciable extent will be prevented by the fact that upon the closing of the air valve, any slight additional movement of the pressure movable unit of the motor will tend to move the valve seat 104 (Figure 4) away from the valve element 103 to thus unseat this valve and establish restricted communication between the chambers of the motor casing. This will effect a sufficient exhaustion of air from the motor casing 18 into the motor casing 19 to arrest movement of the motor parts.

When the brake is to be released, the operator will release the pedal 13 to retract the piston 12, whereupon pressure in the brake lines to the wheel cylinders and in the chamber 37 will force the pressure-generating piston elements of the device toward the left as viewed in Figure 1. Pressure being first released in the master cylinder, the piston body 47 will be freely movable and will move in advance of the pressure movable unit of the motor, and such advance movement of the piston body 47 will reverse the previously described operation of the valve except that the air valve 90 (Figure 3) ordinarily is closed after full brake application has occurred, in which case initial movement of the piston body 47 to the left will cause the shoulder 117 to engage the center points of the lever device 110 to swing the lower end of the lever device toward the left in Figure 1 to unseat the vacuum valve 103. The air valve 90 having been closed, the opening of the vacuum valve 103 will equalize pressures in the two motor casings, and the reciprocating parts will be moved back to their normal positions by the return springs in the brake cylinders and by the motor return spring 128. As the piston body 47 approaches normal position, the lug 34 will engage the rod 52 and hold it stationary to thus unseat the ball valve 54 as the piston body 47 partakes of its last increment of movement to its "off" position.

It will be apparent, of course, that the engagement of the pins 125 (Figure 2) in the slots 126 of the brackets 67 prevents displacement of the lever device 110 endwise thereof. Particular attention is invited to the fact that the present device is highly advantageous for two distinct reasons because of the inclusion of the lever device and the poppet valves operated thereby. In the first place, the arrangement shown is substantially more economical to manufacture than sliding internal valves, it requiring relatively expensive machining to accurately fit the sliding valves to provide accuracy and stability in operation without undue leakage. The valve devices shown are made of simple stampings and the two valve bodies 86 and 100 are identical with each other and produced by the same dies. In the second place, the arrangement shown is highly advantageous for the reason that any movement of either valve takes place through twice the distance and at twice the speed of the movement of the piston body 47 which results in such valve movement. It will be readily appreciated that the leverage increase provided by the mechanism shown and described results in a more rapid response of the motor to operation of the master cylinder than can possibly be obtained by internal valves which move a distance equal to movement of the piston of the master cylinder. The use of poppet valves eliminates any leakage, such as occurs with sliding valves, and the resulting construction is such that an extremely accurate and instantaneous follow-up of the motor with respect to operation of the brake pedal takes place.

The leverage referred to permits the clearance between the bracket wall 68 and the left hand wall of the groove 66 to be made extremely small. In the event of a failure of power in the motor the play referred to will be taken up by manual displacement of the piston structure 41 and the bracket element 67 will be manually operated to transmit manual movement through the plate 41 to the sleeve 46. The two pressure-creating piston elements will thereupon be operated manually as a single unit and the lost motion necessary to be taken up for the manual operation of the brakes is negligible.

As previously pointed out the present structure is capable of highly economical manufacture inasmuch as most of the parts are simple die castings or stampings and there is a substantial duplication of elements to materially reduce the number of dies required to produce the apparatus. For example, the cylinder elements 29 and 35 may be identical die castings, the motor casings 18 and 19 may be stamped from the same dies; the lever elements 110 and 111 may be similarly identically stamped; and the same is true of the valve bodies 86 and 100. The present device, therefore, possesses all of the advantages of prior devices operating on the same principle and is highly advantageous over such prior devices because of economy in manufacture, and because of its instantaneous and accurate operation.

The apparatus has been particularly illustrated in its application to a four-wheel brake system of conventional type. With such an arrangement, the displacement of liquid from the pressure chamber 37 is always equal to the displacement of fluid from the master cylinder 11. Attention is invited to the fact that without changing the master cylinder parts in any way the apparatus may be used in a braking system wherein it is desired to displace from the pressure chamber 37 an amount of fluid greater than that displaced from the master cylinder. For example, many modern trucks, etc. are provided with six wheels all of which have brake cylinders into which fluid must be displaced to effect the necessary braking action. The present apparatus, with relatively minor changes involving a change in the proportion of the parts, can be adapted for use with such braking systems requiring a greater liquid displacement from the pressure chamber 37. This may be done either by die casting a different cylinder element 35 having a larger cylinder 36 or by boring the cylinder element 35 for the same purpose. A correspondingly larger power operated piston unit comprising the elements 58 and 59 will be used with such an arrangement, and no other parts need be changed in any way. The displacement of liquid from the pressure chamber 37 thus may be increased in proportion to the displacement from the master cylinder in accordance with the brake fluid displacement necessary for a given installation.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. In a brake operating mechanism for a hydraulic brake system having a hydraulic brake cylinder and a pedal-controlled master cylinder, a booster unit comprising a high pressure cylinder communicating with the brake cylinder, a piston movable in said high pressure cylinder to displace fluid therefrom, a differential fluid pressure operated motor comprising a casing carrying said high pressure cylinder and having a pressure movable unit therein connected to said piston, a pair of valves carried by said pressure movable unit and respectively operable for establishing differential pressures in said motor and for equalizing pressures therein, the valve for establishing differential pressures being normally closed and the valve for equalizing pressures in said motor being normally open, lever means within said motor casing having mechanical connection with both valves and operable for first closing the pressure equalizing valve and then opening the other valve, a chamber carried by said motor casing and communicating with the master cylinder, and a pressure responsive device in said chamber movable by fluid entering such chamber from the master cylinder and projecting into said motor and having mechanical connection with said lever means for operating it.

2. In a brake operating mechanism for a hydraulic brake system having a hydraulic brake cylinder and a pedal-controlled master cylinder, a booster unit comprising a high pressure cylinder communicating with the brake cylinder, a piston movable in said high pressure cylinder to displace fluid therefrom, a differential pressure operated motor comprising a casing carrying said high pressure cylinder and having a pressure movable unit therein connected to said piston, a pair of valves carried by said pressure movable unit and respectively operable for establishing differential pressures in said motor and for equalizing pressures therein, the valve for establishing differential pressures being normally closed and the valve for equalizing pressures in said motor being normally open, lever means within said motor casing having mechanical connection with both valves and operable for first closing the pressure equalizing valve and then opening the other valve, a low pressure cylinder carried by said motor casing in axial alinement with said high pressure cylinder and communicating with the master cylinder, and a pressure responsive device in said low pressure cylinder movable by fluid displaced thereinto from the master cylinder, said pressure responsive device having mechanical connection with said lever means to operate it and having a plunger portion projecting axially through said piston to cooperate with the latter in displacing fluid from said pressure cylinder.

3. In a brake operating mechanism for a hydraulic brake system having a hydraulic brake cylinder and a pedal-controlled master cylinder, a booster unit comprising a high pressure cylinder communicating with the brake cylinder, a piston movable in said high pressure cylinder to displace fluid therefrom, a differential fluid pressure operated motor comprising a casing carrying said high pressure cylinder and having a pressure movable unit therein connected to said piston, a pair of valves carried by said pressure movable unit and respectively operable for establishing differential pressures in said motor and for equalizing pressures therein, the valve for establishing differential pressures being normally closed and the valve for equalizing pressures in said motor being normally open, lever means within said motor casing having mechanical connection with both valves and operable for first closing the pressure equalizing valve and then opening the other valve, a low pressure cylinder carried by said motor casing at the side thereof opposite said high pressure cylinder in axial alinement with the latter and communicating with the master cylinder, and a piston structure comprising a piston element mounted in said low pressure cylinder and movable by fluid entering thereinto from the master cylinder, said piston structure having a plunger portion projecting axially through the piston in said high pressure cylinder to displace fluid therefrom upon movement of said piston element, said lever means comprising a lever arranged substantially diametrically in said motor and projecting on opposite sides of the axis thereof, said piston structure being shouldered for engagement with said lever to impart movement thereto.

4. In a brake operating mechanism for a hydraulic brake system having a hydraulic brake cylinder and a pedal-controlled master cylinder, a booster unit comprising a high pressure cylinder communicating with the brake cylinder, a piston movable in said high pressure cylinder to displace fluid therefrom, a differential fluid pressure operated motor comprising a casing carrying said high pressure cylinder and having a pressure movable unit therein connected to said piston, a pair of valves carried by said pressure movable unit and respectively operable for establishing differential pressures in said motor and for equalizing pressures therein, the valve for establishing differential pressures being normally closed and the valve for equalizing pressures in said motor being normally open, lever means within said motor casing having mechanical connection with both valves and operable for first closing the pressure equalizing valve and then opening the other valve, a low pressure cylinder carried by said motor casing at the side thereof opposite said high pressure cylinder in axial alinement with the latter and communicating with the master cylinder, a piston structure comprising a piston element mounted in said low pressure cylinder and movable by fluid entering thereinto from the master cylinder, said piston structure having a plunger portion projecting axially through the piston in said high pressure cylinder to displace fluid therefrom upon movement of said piston element, said lever means comprising a lever arranged substantially diametrically in said motor and projecting on opposite sides of the axis thereof, said piston structure being shouldered for engagement with said lever to impart movement thereto, and a rigid member straddling said lever and fixed to said pressure movable unit, said rigid member having lost motion connection with said piston structure and being engageable with said low pressure cylinder to limit movement of said pressure movable unit to its "off" position.

5. In a brake operating mechanism for a hydraulic brake system having a hydraulic brake cylinder and a pedal-controlled master cylinder, a booster unit comprising a differential fluid pressure operated motor, a high pressure cylinder and a low pressure cylinder carried by said motor and communicating respectively with the brake cylinder and with the master cylinder, said motor comprising a pressure-operable unit including a fluid displacing piston movable in said high pressure cylinder to displace fluid under pressure therefrom to the brake cylinder, follow-up control valve means for said motor comprising a pair of valve elements carried by and movable with said pressure-operable unit and a lever device pivoted to said pressure-operable unit and having mechanical connection with both valves to operate them, and a piston in said low pressure cylinder movable by fluid displaced into such cylinder from the master cylinder, said last named piston projecting into said motor and having mechanical connection with said lever device to operate the latter.

6. In a brake operating mechanism for a hydraulic brake system having a hydraulic brake cylinder and a pedal-controlled master cylinder, a booster unit comprising a differential fluid pressure operated motor having a casing and a pressure-operable unit therein including a rigid structure and a flexible diaphragm having an inner periphery secured to said structure and an outer periphery secured to said casing, a high pressure cylinder and a low pressure cylinder carried by said casing and communicating respectively with the brake cylinder and with the master cylinder, a piston connected to said rigid structure and operable in said high pressure cylinder to displace fluid therefrom into the wheel cylinder, a follow-up control valve means for said motor comprising a pair of valve elements carried by and movable with said rigid structure and a lever device pivoted to said rigid structure within said casing and having mechanical connection with both valve elements for operating them, and a piston in said low pressure cylinder movable by fluid displaced into the latter from the master cylinder and having mechanical connection with said lever device to operate it.

7. In a brake operating mechanism for a hydraulic brake system having a hydraulic brake cylinder and a pedal-controlled master cylinder, a booster unit comprising a differential fluid pressure operated motor having a casing and a pressure-operable unit therein dividing it into a pair of pressure chambers, a high pressure cylinder and a low pressure cylinder carried by said casing and communicating respectively with the wheel cylinder and the master cylinder, a piston connected to said pressure operable unit and movable thereby in said high pressure cylinder, one of said pressure chambers being in constant communication with a source of relatively low pressure, a valve carried by said pressure operable unit and normally open to connect said pressure chambers, a second valve carried by said pressure-operable unit for controlling communication between a source of higher pressure and the other pressure chamber, a lever pivoted to said pressure operable unit and having mechanical connection with both valves, said lever being movable to close said first named valve and open said second named valve, and a piston in said low pressure cylinder movable by fluid displaced into the latter and having mechanical connection with said lever to move it.

8. In a brake operating mechanism for a hydraulic brake system having a hydraulic brake cylinder and a pedal-controlled master cylinder, a booster unit comprising a differential fluid pressure operated motor, a high pressure cylinder and a low pressure cylinder carried by said motor and communicating respectively with the brake cylinder and with the master cylinder, said motor comprising a pressure-operable unit including a fluid displacing piston movable in said high pressure cylinder to displace fluid under pressure therefrom to the brake cylinder, follow-up control valve means for said motor comprising a pair of valve elements carried by and movable with said pressure-operable unit and a lever device pivoted to said pressure-operable unit and having mechanical connection with both valves to operate them, and a piston in said low pressure cylinder movable by fluid displaced into such cylinder from the master cylinder, said last named piston projecting into said motor and having mechanical connection with said lever device to operate the latter, said last named piston and said pressure-operable unit having portions engageable independently of said lever device to limit lever-operating movement of said last named piston relative to said pressure operable unit.

RUDOLPH J. KLIMKIEWICZ.